US008839300B2

(12) United States Patent
White

(10) Patent No.: US 8,839,300 B2
(45) Date of Patent: Sep. 16, 2014

(54) METHOD AND SYSTEM FOR PRESENTING ELECTRONIC PROGRAMMING GUIDES

(75) Inventor: Scott White, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1015 days.

(21) Appl. No.: 12/033,086

(22) Filed: Feb. 19, 2008

(65) Prior Publication Data

US 2009/0210903 A1 Aug. 20, 2009

(51) Int. Cl.
*H04N 7/167* (2011.01)
*H04N 21/475* (2011.01)
*H04N 21/431* (2011.01)
*H04N 5/445* (2011.01)
*H04N 21/482* (2011.01)
*H04N 21/485* (2011.01)
*H04N 21/443* (2011.01)

(52) U.S. Cl.
CPC ....... *H04N 5/44543* (2013.01); *H04N 21/4755* (2013.01); *H04N 21/4316* (2013.01); *H04N 5/44591* (2013.01); *H04N 21/482* (2013.01); *H04N 21/4858* (2013.01); *H04N 21/4438* (2013.01)
USPC ............................... 725/47; 725/44; 715/838

(58) Field of Classification Search
USPC .......................................................... 725/47
See application file for complete search history.

(56) References Cited

U.S. PATENT DOCUMENTS

| | | | | |
|---|---|---|---|---|
| 6,002,394 A * | 12/1999 | Schein et al. | .................... | 725/39 |
| 6,675,387 B1 * | 1/2004 | Boucher et al. | ............... | 725/105 |
| 6,990,676 B1 * | 1/2006 | Proehl et al. | ..................... | 725/40 |
| 2005/0071782 A1 * | 3/2005 | Barrett et al. | ................. | 715/838 |
| 2005/0155063 A1 * | 7/2005 | Bayrakeri et al. | ............... | 725/47 |
| 2005/0235312 A1 * | 10/2005 | Karaoguz et al. | ............... | 725/38 |
| 2007/0011706 A1 * | 1/2007 | Chiu et al. | ...................... | 725/56 |
| 2007/0050813 A1 | 3/2007 | Lee | | |
| 2007/0061840 A1 | 3/2007 | Walter et al. | | |
| 2007/0136750 A1 * | 6/2007 | Abanami et al. | ................. | 725/44 |
| 2008/0092173 A1 * | 4/2008 | Shannon et al. | ................ | 725/47 |

* cited by examiner

*Primary Examiner* — Fernando Alcon
(74) *Attorney, Agent, or Firm* — Guntin & Gust, PLC; Ralph Trementozzi

(57) ABSTRACT

A system that incorporates teachings of the present disclosure may include, for example, a media processor having a controller to present a graphic user interface (GUI) for customizing an electronic programming guide (EPG), the GUI including a plurality of scrollable media channels, each media channel accompanied by an image, a description of the media channel, an option to select the media channel for inclusion in the EPG, a first button to customize the EPG according to one or more media channels selected, and a second button to request additional information about a media channel highlighted in the GUI. Other embodiments are disclosed.

20 Claims, 8 Drawing Sheets

METHOD AND SYSTEM FOR PRESENTING ELECTRONIC PROGRAMMING GUIDES

FIELD OF THE DISCLOSURE

The present disclosure relates generally to electronic programming guides (EPGs) and more specifically to a system and method for presenting EPGs.

BACKGROUND

Electronic programming guides are useful tools for guiding subscribers in selecting from a large suite of television (TV) programs supplied by media communication systems such as satellite TV, cable TV, and Internet Protocol TV.

DETAILED DESCRIPTION

One embodiment of the present disclosure entails a method involving presenting a graphical user interface (GUI) having a plurality of scrollable media channels, each media channel accompanied by a thumbnail, a description of the media channel, and an option to select the media channel for inclusion in an electronic programming guide (EPG), presenting in the GUI a first button to accept inclusion in the EPG the one or more media channels selected, and a second button to request additional information about a media channel highlighted in the GUI, and customizing the EPG according to one or more media channel selections.

Another embodiment of the present disclosure entails a media processor having a controller to present a GUI for customizing an EPG, the GUI including a plurality of scrollable media channels, each media channel accompanied by an image, a description of the media channel, an option to select the media channel for inclusion in the EPG, a first button to customize the EPG according to one or more media channels selected, and a second button to request additional information about a media channel highlighted in the GUI.

Yet another embodiment of the present disclosure entails a computer-readable storage medium having computer instructions for presenting a GUI for customizing an EPG, the GUI including a plurality of scrollable media channels each accompanied by a descriptive image and a button to request additional information about a media channel highlighted in the GUI.

Figure 1:
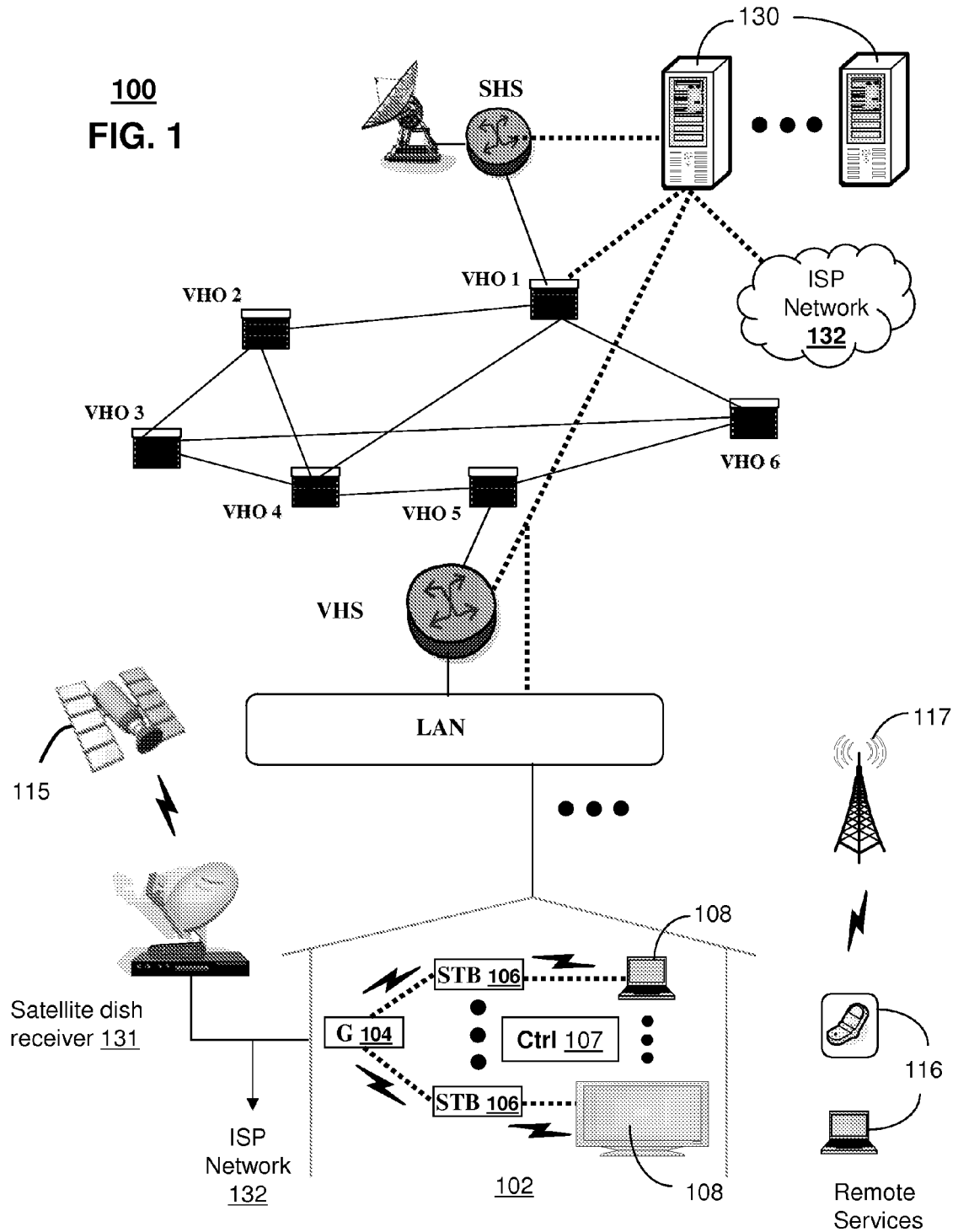
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
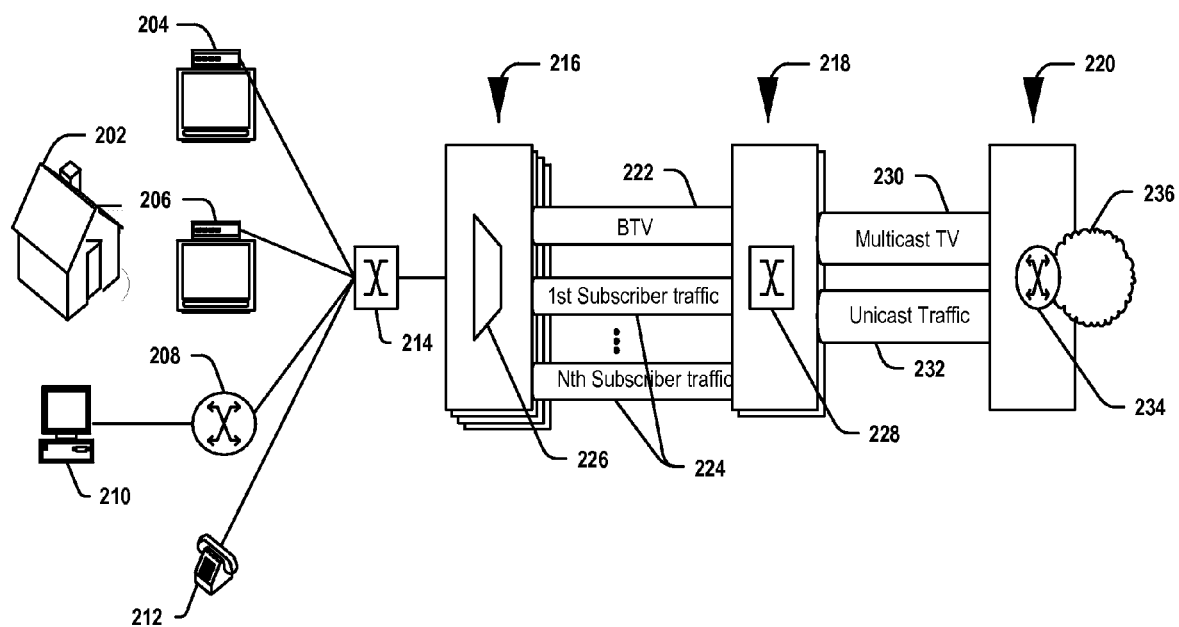

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220. The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remote control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
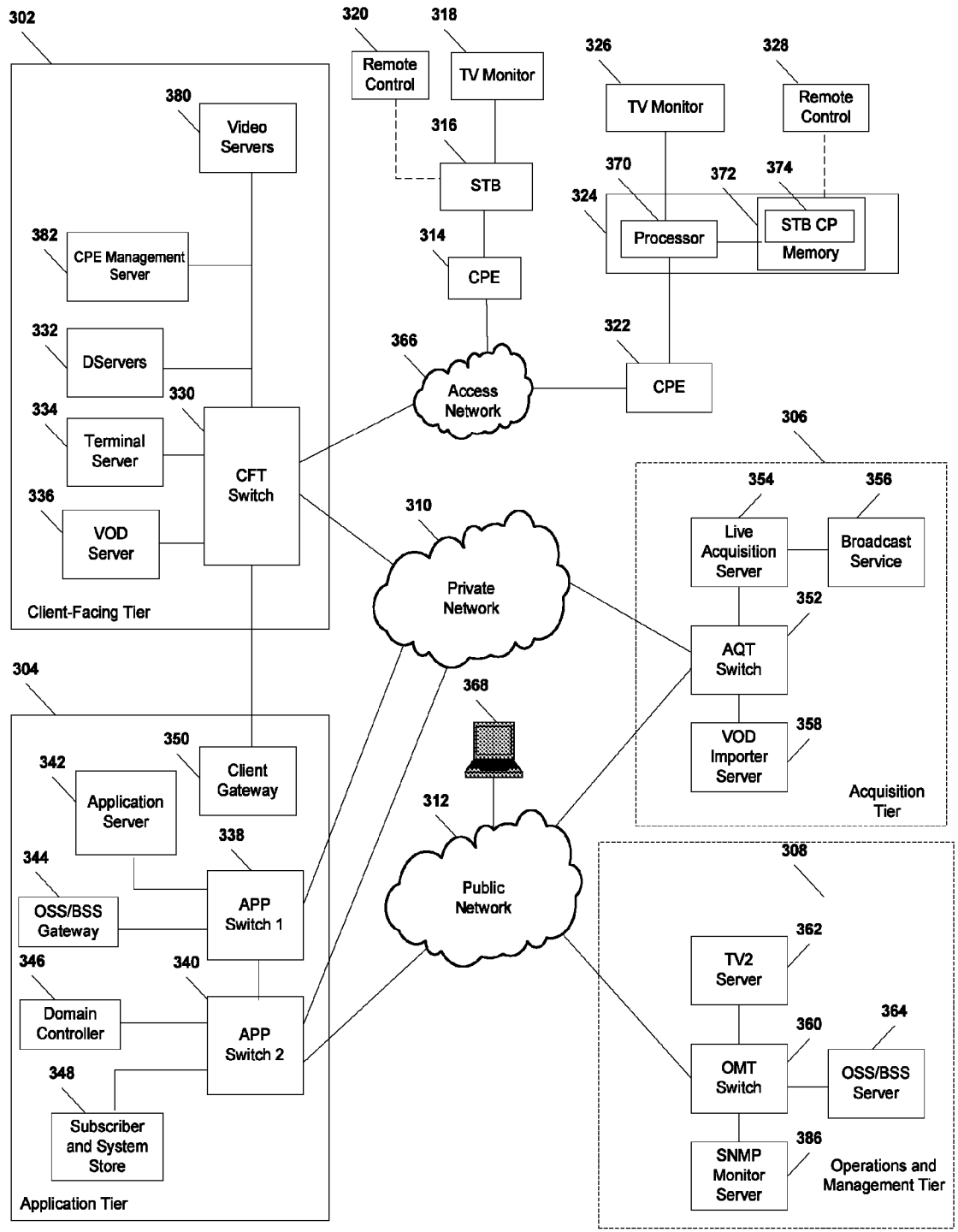

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media communication system embodiments that other suitable media communication systems for distributing broadcast media content as well as peer-to-peer exchange of content can be applied to the present disclosure.

Figure 4:
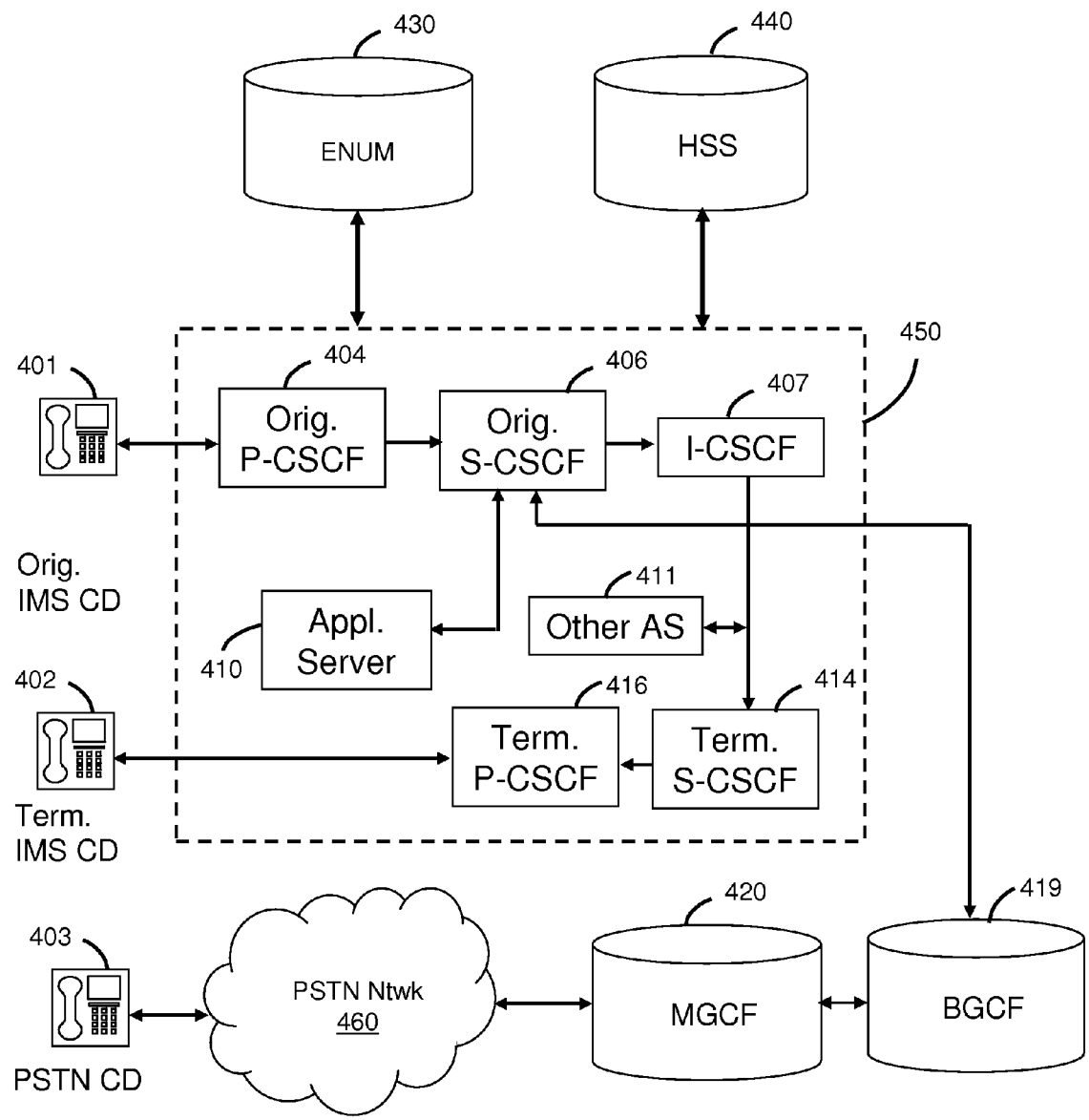

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating S-CSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (BGCF) 419.

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
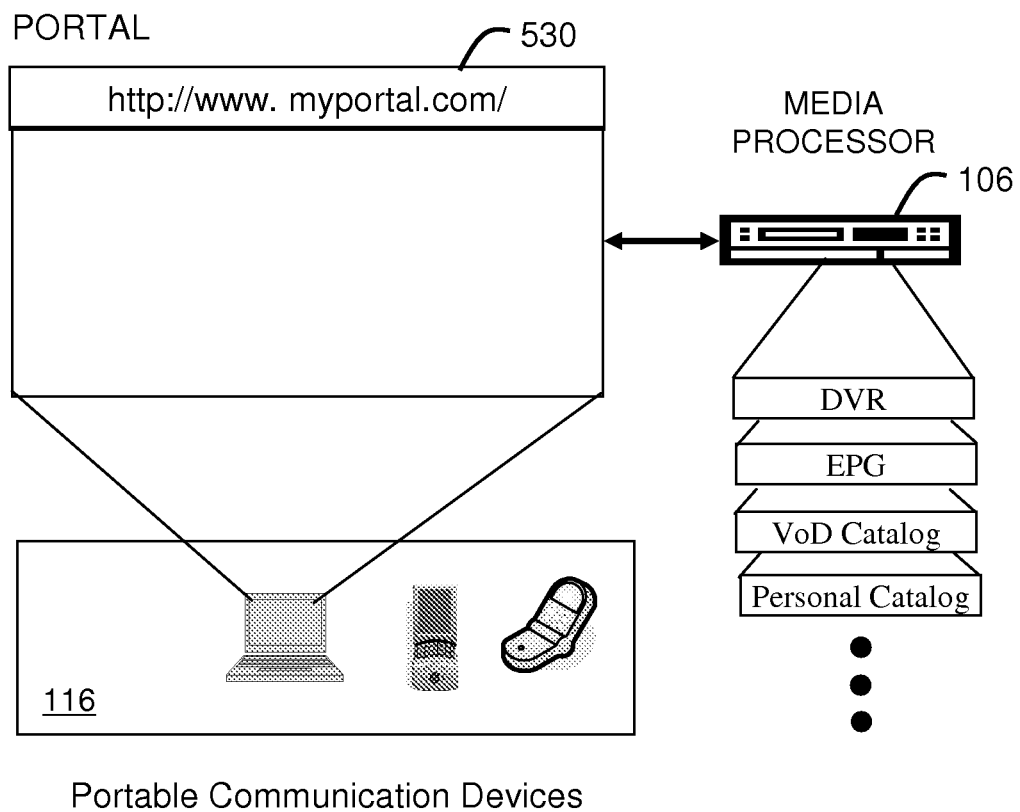
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
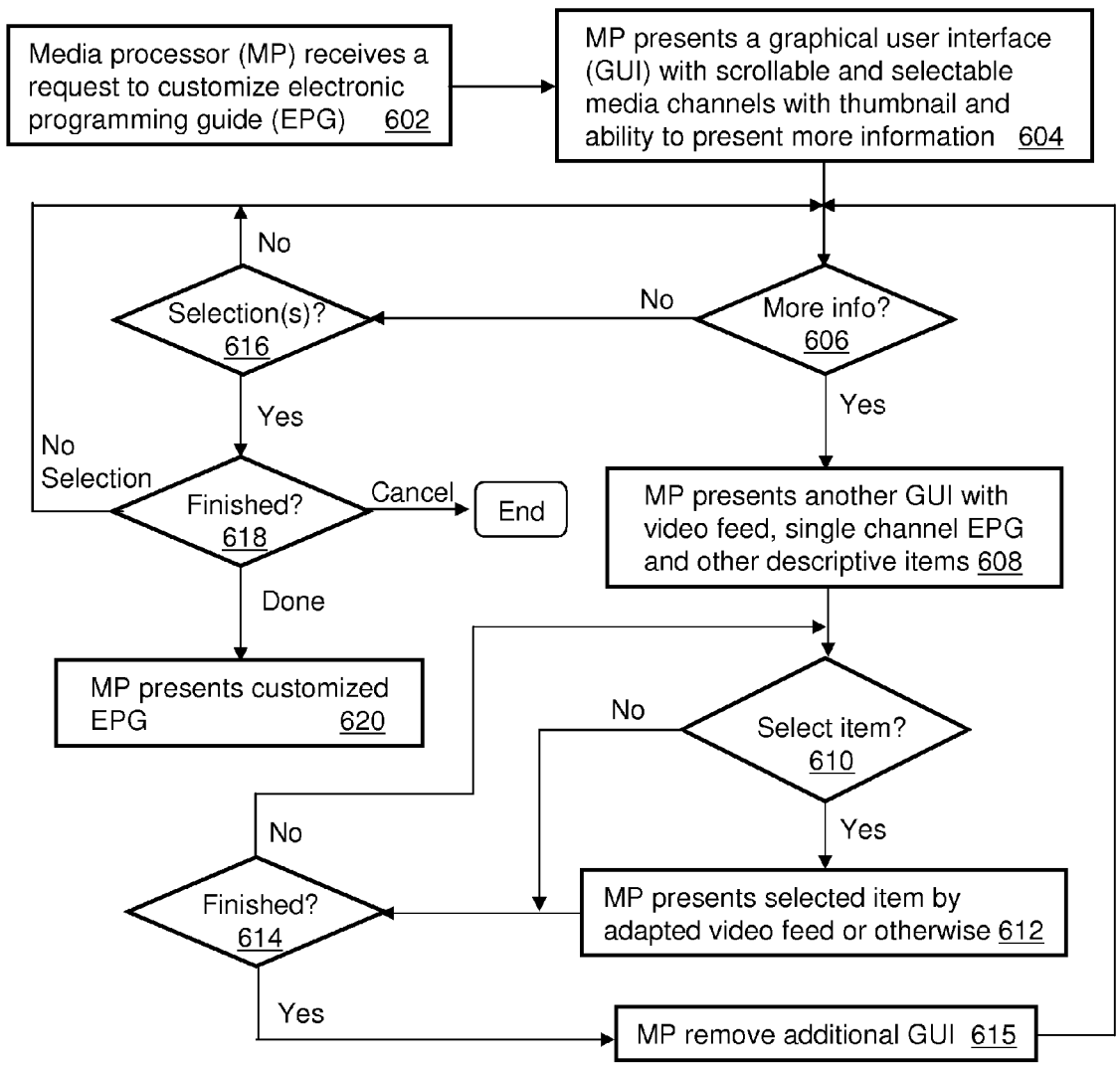
FIG. 6 depicts an exemplary method operating in portions of the communication systems of FIGS. 1-4.
Figure 7:
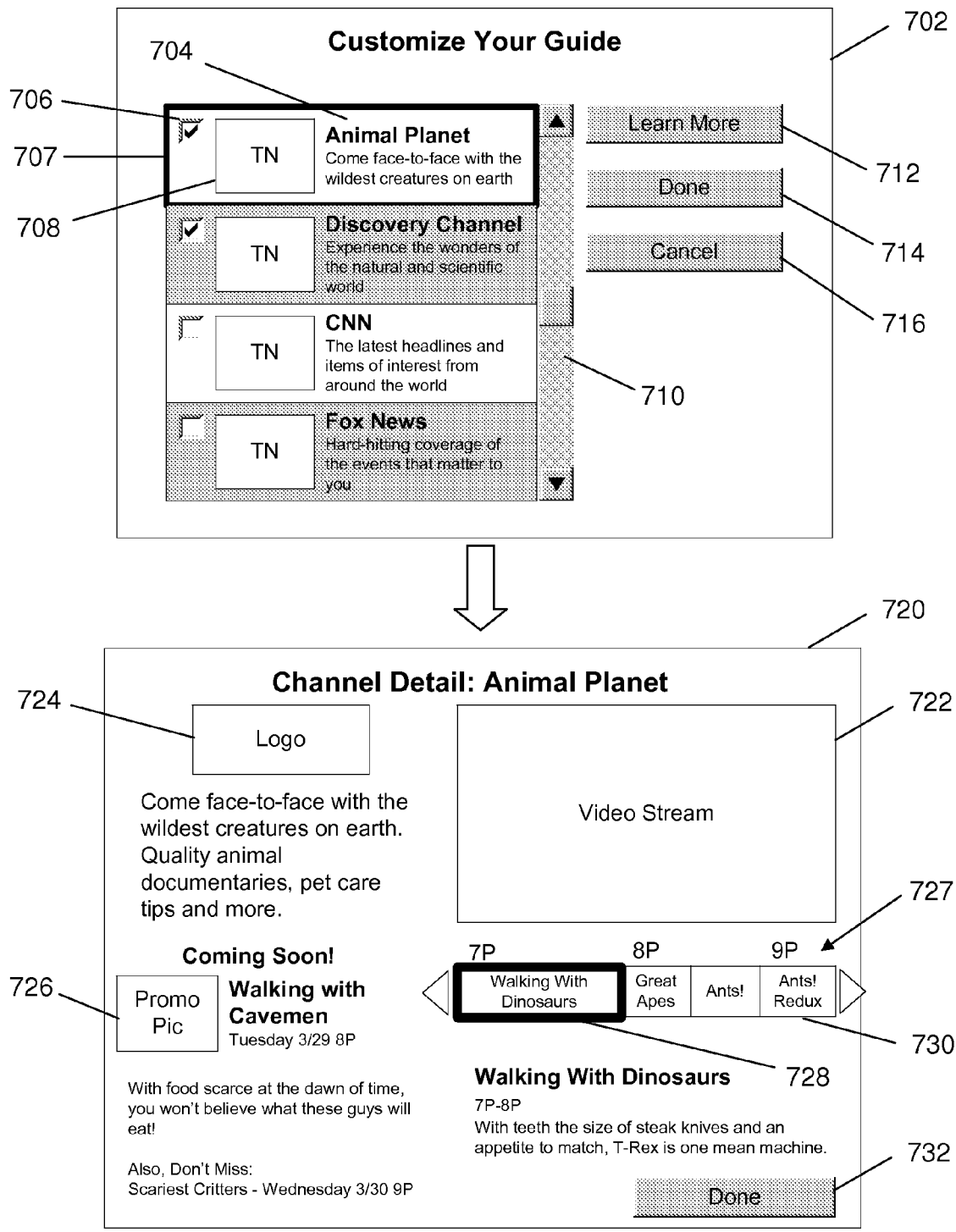
FIG. 7 depicts graphical user interfaces (GUIs) for customizing an electronic programming guide (EPG) according to the method of FIG. 6.

FIG. 6 depicts an exemplary method 600 operating in portions of media communication systems 100-400. FIG. 7 depicts graphical user interfaces (GUIs) associated with the steps of method 600. Method 600 begins with step 602 in which a media processor (MP) such as the STB of FIGS. 1-3 receives a request to customize an electronic programming guide (EPG). The request can arise in response to a subscriber of the MP initiating the request from a remote controller such as reference 107 of FIG. 1. In step 604 the MP presents as illustrated in FIG. 7 a GUI 702 with scrollable and selectable media channels 710, each media channel accompanied by a thumbnail 708, a description of the media channel 704, and an option to select the media channel 706 for inclusion in the customized EPG. The GUI 702 can also include a button 712 (referred to herein as "Learn More" button 712) to request additional information about a highlighted media channel 707 in the GUI, a button 714 (referred to herein as "Done" button 714) to indicate completion of the customized EPG, and a button 716 (referred to herein as "Cancel" button 716) to cancel the customization process dictated by method 600.

Using common up and down navigation keys of a remote controller such as reference 107, a subscriber can highlight a select media channel such as the Animal Planet channel. A subscriber knows that the Animal Planet channel is highlighted by a bold rectangle 707 encompassing the channel. The thumbnail 708 which accompanies the media channel can represent a still image or a moving image. In an illustrative embodiment, the still image can represent a media channel logo such as a trademark logo. In another illustrative embodiment, the still image can represent a snapshot of an active media program in the select media channel. The snapshot can be a still image of a frame of the active media program, or a cover page or banner used to describe the active media program. For instance, if the media channel is actively broadcasting Star Wars Episode I, the snapshot can be a frame from the active movie, or a banner depicting the movie (such as marketing banners used by movie theaters).

In yet another illustrative embodiment, the moving image can represent a live feed of the active media program. For example, referring back to the Star Wars Episode I illustration, the live feed can represent streaming video captured by the MP which is presented in the thumbnail. To accommodate streaming video of live media programs on each thumbnail, the MP can be directed to sample video from each media channel at a reduced presentation quality and frame rate. The MP can then resize the captured video and present a live feed in each thumbnail of each corresponding media channel depicted in GUI 702. Since the thumbnails are relatively small compared to a full screen display, the quality of the video presented can be suitable to convey the type of live programming taking place at the time the subscriber is determining a selection of a customized EPG. For the media channels located off screen, the MP can preserve computing resources by sampling these channels only after the subscriber scrolls up or down by way of the scroll bar 710 to show the media channel and its corresponding thumbnail in GUI 702.

In steps 606, 616, and 618 the MP can monitor the selection of buttons 712-716. If for example when the "Learn More" button 712 is depressed, the MP can be directed to proceed from step 606 to step 608. In step 608, the MP can present another GUI 720 which can provide additional information about the highlighted media channel. GUI 720 can be superimposed in part on the customization GUI 702, temporarily replace GUI 702, or can be placed next to GUI 702 in an available portion of a canvas of a media presentation device (such as reference 108 of FIG. 1) used by the MP to present these GUIs. The location of GUI 720 therefore can depend on the amount of presentation area available in the media presentation device. GUI 720 can include a video stream 722, a media programming guide for the select media channel 727, one or more promotions 726, a logo associated with the select media channel 724, a "Done" button 732 to indicate that the GUI 720 is no longer needed, and additional descriptive information about the select media channel.

The descriptive information provided in GUI 720 can be segmented by association with each of the GUI elements of GUI 720. For example, the logo 724 can be accompanied with descriptive information of the media channel. The promotion element 726 can be accompanied with descriptive information about the promotion. A highlighted media program 728 in the programming guide 727 can be accompanied with descriptive information about the highlighted media program.

Some or all of the GUI elements shown in GUI 720 can be selected to invoke interactive responses. For example, when the MP detects in step 610 a media program has been highlighted in the programming guide accomplished by navigation means of a remote controller managing the MP, the MP can be directed to step 612 where it presents the item by adapting the video feed in window 722 or provide another suitable response. For instance, suppose that media program 728 is an active media program being presented by the media communication system at the time it is highlighted, the video stream in window 722 can be adapted to represent the live feed of the media program. Suppose instead that media program 728 has already expired. In this illustration the MP can adapt the video stream in window 722 so that it presents a recording of the expired media program. Suppose instead that a future media program is highlighted such as media program

730. The MP in this illustration can adapt the video stream in window 722 so that a preview of the upcoming media program is presented.

In another illustrative embodiment, suppose the logo or promotion is selected. Step 612 in this representative embodiment can represent a video stream and/or another GUI (not shown) which describes the media channel further (such as the history, purpose or vision of the broadcasters of this channel), and/or a presentation of information relating to the selected promotion. Accordingly GUI 720 can include any form of selectable GUI elements which can affect the video stream of window 722 and/or create additional GUI windows (which can be further nested) with information describing the selected item. The selectable GUI elements can by hypertext links (such as HTML hypertext), graphical elements, and so on.

Once the selected item is presented in step 612, the MP can be directed to step 614 to determine if the GUI is no longer needed such as by depression of the "Done" button 732 by the subscriber. If this button is selected, the MP proceeds to step 615 where it terminates the detailed GUI window 720, and proceeds to step 606 to monitor selection of the GUI buttons of GUI 702. If the "Done" button 732 is not depressed, the MP proceeds to step 610 where it continues to monitor selections in GUI 720.

Referring back to step 606, if depression of the "Learn More" button 712 is not detected in this step, the MP can be directed to step 616 to determine if any of the media channels have been selected with a checkbox such as reference 706 shown in FIG. 7. If no selections are detected, the MP can be directed to return to step 606. Otherwise, the MP can monitor the selection of the "Done" button 714 or "Cancel" button in step 618. If the "Cancel" button 716 is depressed, the MP terminates the GUI 702 without generating a customized EPG. If a customized EPG was previously generated, the selection of the "Cancel" button 716 keeps the customized EPG unchanged. If the "Done" button 714 is depressed, the MP can proceed to step 620 where it generates the customized EPG as directed by the selections made with the checkboxes 706. This step can replace previous incarnations of a customized EPG.

Upon reviewing the aforementioned embodiments, it would be evident to an artisan with ordinary skill in the art that said embodiments can be modified, reduced, or enhanced without departing from the scope and spirit of the claims described below. For example, method 600 can be adapted so that EPG customization takes place somewhere other than in the MP. In one illustrative embodiment, method 600 can be adapted so that EPG customization takes place via portal 530. In this embodiment, a subscriber can log into a subscriber account at portal 530 an customize the EPG utilizing the computing resources of the media communication system. In another illustrative embodiment, method 600 can be adapted so that selections associated with a previously customized EPG are shown at the time GUI 702 is presented in step 604.

Other suitable modifications that can be applied to the present disclosure without departing from the scope of the claims below. Accordingly, the reader is directed to the claims section for a fuller understanding of the breadth and scope of the present disclosure.

Figure 8:
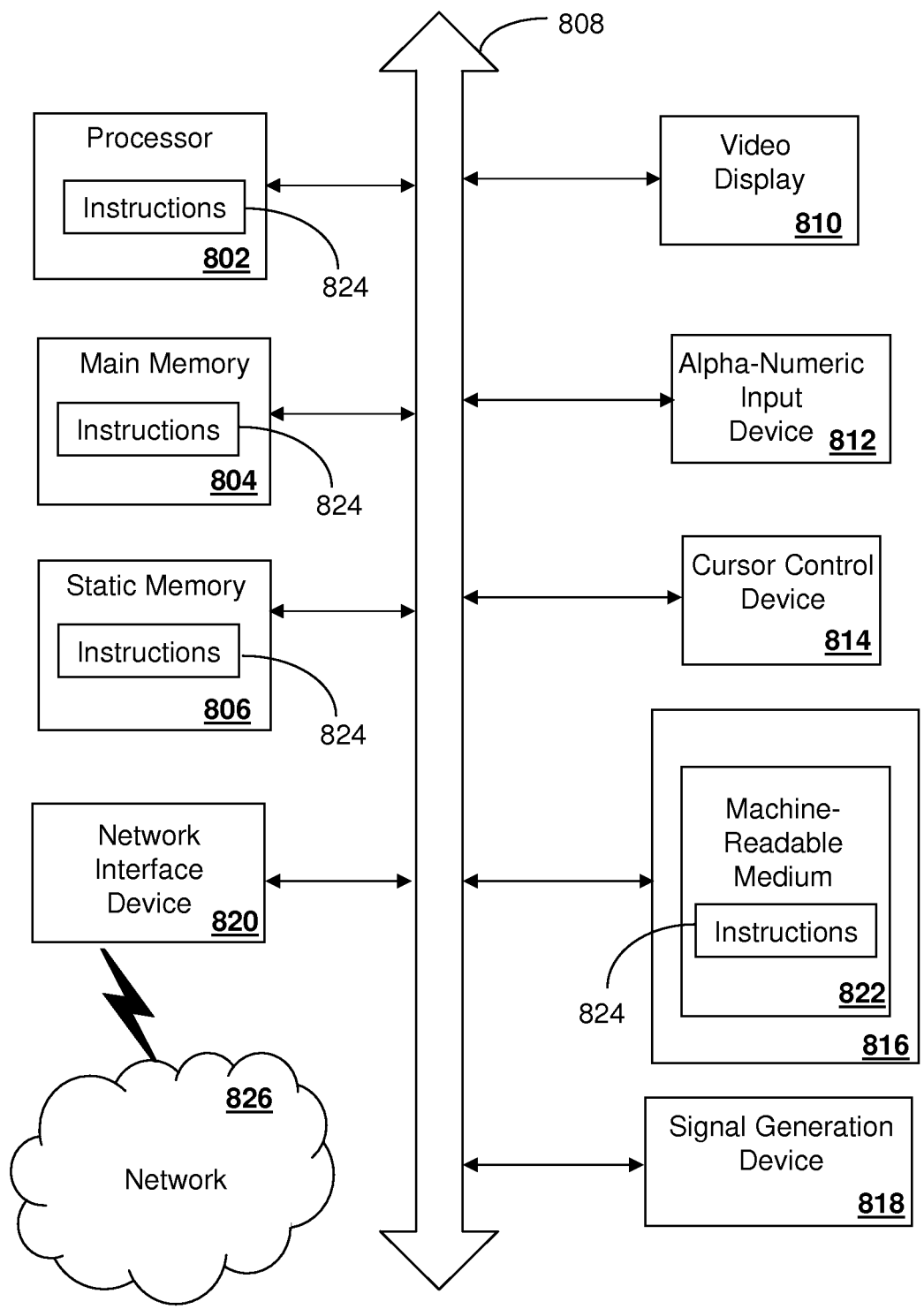
FIG. 8 is a diagrammatic representation of a machine in the form of a computer system within which a set of instructions, when executed, may cause the machine to perform any one or more of the methodologies discussed herein.

FIG. 8 depicts an exemplary diagrammatic representation of a machine in the form of a computer system 800 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT)). The computer system 800 may include an input device 812 (e.g., a keyboard), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions (e.g., software 824) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 824, or that which receives and executes instructions 824 from a propagated signal so that a device connected to a network environment 826 can send or receive voice, video or data, and to communicate over the network 826 using the instructions 824. The instructions 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
responsive to a request to customize an electronic programming guide, presenting, by a set top box, a graphical user interface having a window with a plurality of on-screen media channel indicators of a plurality of scrollable media channel indicators, wherein each media channel indicator of the plurality of on-screen media channel indicators is accompanied by a thumbnail, a description of a corresponding media channel, and an option to select the corresponding media channel for inclusion in the electronic programming guide and wherein each thumbnail comprises video content scheduled for broadcast on the corresponding media channel;
sampling, by the set top box, video content of a corresponding media channel of an off-screen media channel indicator of the plurality of scrollable media channel indicators for presentation in the thumbnail of the off-screen media channel indicator only after the thumbnail of the off-screen media channel indicator is depicted in the window responsive to being scrolled up or down in the window, wherein the corresponding media channel of the off-screen media channel indicator differs from corresponding media channels of the plurality of on-screen media channel indicators;
presenting, by the set top box, in the graphical user interface a first button to accept inclusion in the electronic programming guide a corresponding media channel of a select media channel indicator of the plurality of scrollable media channel indicators, and a second button to request additional information about a corresponding media channel of a highlighted media channel indicator of the plurality of on-screen media channel indicators in the graphical user interface; and
customizing, by the set top box, the electronic programming guide according to the select media channel indicator of the plurality of scrollable media channel indicators responsive to detecting an assertion of the first button.

2. The method of claim 1, comprising detecting, by the set top box, a selection of the first button.

3. The method of claim 1, comprising:
detecting, by the set top box, a selection of the second button while the select media channel indicator is highlighted; and
presenting, by the set top box, an additional graphical user interface with an attribute selected from a group consisting of a video stream, a media programming guide for the select media channel indicator, a promotion, a logo associated with the select media channel indicator and additional descriptive information about the corresponding media channel of the select media channel indicator.

4. The method of claim 3, wherein the video stream is selected from a group consisting of video describing the corresponding media channel of the select media channel indicator, video of an active media program of the corresponding media channel of the select media channel indicator and video previewing future media programs of the corresponding media channel of the select media channel indicator.

5. The method of claim 3, wherein the electronic programming guide comprises a media program description with a viewable time scale, and wherein the electronic programming guide is slideably controllable to view other media program descriptions of past, present or future media programs.

6. The method of claim 5, comprising:
   detecting, by the set top box, a selection of a media program description in the electronic programming guide; and
   adapting, by the set top box, the video stream to present video associated with the media program description.

7. The method of claim 6, wherein the media program description is selected from a group consisting of a media program previously broadcasted, a media program actively broadcasted and a media program not yet broadcasted, wherein the video stream presents content selected from the group consisting of a recording of the media program previously broadcasted, video of the media program actively broadcasted and video previewing the media program not yet broadcasted.

8. The method of claim 1, wherein the electronic programming guide is supplied by a media communication system, and wherein the media communication system is selected from a group consisting of an internet protocol television communication system, a cable television communication system, a satellite television communication system, a public switched television network, a voice over internet protocol communication system and an internet protocol multimedia subsystem combining the public switched television network and voice over internet protocol communication systems.

9. A set-top box, comprising:
   a memory to store computer instructions; and
   a controller coupled to the memory, wherein responsive to execution of the computer instructions, the controller performs operations comprising:
      presenting a graphic user interface for customizing an electronic programming guide responsive to a request to customize the electronic programming guide, the graphical user interface including a window with a plurality of on-screen media channel indicators of a plurality of scrollable media channel indicators, wherein each media channel indicator of the plurality of on-screen media channel indicators is accompanied by video content, a description of a corresponding media channel, and an option to select the corresponding media channel for inclusion in the electronic programming guide;
      sampling video content of a corresponding media channel of an off-screen media channel indicator of the plurality of scrollable media channel indicators for presentation in the plurality of scrollable media channel indicators only after the off-screen media channel indicator is depicted in the window responsive to the off-screen media channel indicator being scrolled into a viewing area of the window, wherein the corresponding media channel of the off-screen media channel indicator differs from corresponding media channels of the plurality of on-screen media channel indicators;
      customizing the electronic programming guide according to a media channel indicator selection responsive to a detection of an assertion of a first button; and
      requesting additional information about a corresponding media channel of a media channel indicator of the plurality of on-screen media channel indicators highlighted in the graphical user interface responsive to an assertion of a second button.

10. The set-top box of claim 9, wherein execution of the computer instructions causes the controller to perform operations comprising detecting a selection of the first button.

11. The set-top box of claim 9, wherein execution of the computer instructions causes the controller to perform operations comprising:
   detecting a selection of the second button while a select media channel indicator of the plurality of on-screen media channel indicators is highlighted; and
   presenting an additional graphical user interface with a feature selected from a group consisting of a video stream, a media programming guide for the select media channel indicator, a promotion, a logo associated with the select media channel indicator and additional descriptive information about the select media channel indicator.

12. The set-top box of claim 11, wherein the video stream is selected from a group consisting of video describing a corresponding media channel of the select media channel indicator, video of an active media program of the corresponding media channel of the select media channel indicator and video previewing future media programs of corresponding media channel of the select media channel indicator.

13. The set-top box of claim 11, wherein the media programming guide comprises a media program description with a viewable time scale, and wherein the media programming guide is slideably controllable to view past, present or future media programs.

14. The set-top box of claim 13, wherein execution of the computer instructions causes the controller to perform operations comprising:
   detecting a selection of one of the media program description in the electronic programming guide; and
   adapting the video stream to present video associated with the media program description,
   wherein the media program description is selected from a group consisting of: a previously broadcasted media program; an actively broadcasted media program; and a yet to be broadcasted media program, wherein the video stream presents content selected from the group consisting of a recording of the previously broadcasted media program, video of the actively broadcasted media program and video previewing the yet to be broadcasted video program.

15. The set-top box of claim 9, wherein the set-top box operates in a media communication system, and wherein the media communication system is selected from a group consisting of an internet protocol television communication system, a cable television communication system, a satellite television communication system, a public switched television network, a voice over internet protocol communication system and an internet protocol multimedia subsystem combining the public switched television network and voice over internet protocol communication systems.

16. A computer-readable storage device, comprising computer instructions which, responsive to being executed by a controller, cause the controller to perform operations comprising:

presenting a graphical user interface for customizing an electronic programming guide responsive to receiving a request to customize the electronic programming guide, the graphical user interface including a window with a plurality of on-screen media channel indicators of a plurality of scrollable media channel indicators each accompanied by video content and a button to request additional information about a corresponding media channel of a highlighted media channel indicator of the plurality of on-screen media channel indicators in the graphical user interface; and sampling video content of a corresponding media channel of an off-screen media channel indicator of the plurality of scrollable media channel indicators for presentation in the media channel indicator that is off screen only after the off-screen media channel indicator is depicted in the window responsive to being scrolled into the window, wherein the corresponding media channel of the off-screen media channel indicator differs from corresponding media channels of the plurality of on-screen media channel indicators.

17. The computer-readable storage device of claim 16, wherein the operations further comprise:

detecting a media channel indicator selection from the plurality of scrollable media channel indicators; and customizing the electronic programming guide according to the media channel indicator selection.

18. The computer-readable storage device of claim 16, wherein the operations further comprise:

detecting a selection of the button while a select media channel indicator is highlighted; and presenting an additional graphical user interface with a feature selected from a group consisting of a video stream, a programming guide for a corresponding media channel of the select media channel indicator, a promotion; a logo associated with the corresponding media channel of the select media channel indicator and additional descriptive information about the corresponding media channel of the select media channel indicator.

19. The computer-readable storage device of claim 18, wherein the programming guide comprises a media program description with a viewable time scale, and wherein the programming guide can be slideably controlled to view past, present or future media programs, and wherein execution of the computer instructions causes the controller to perform operations comprising:

detecting a selection of the media program description in the programming guide; and adapting the video stream responsive to the detecting of the selection to present video associated with the media program description.

20. The computer-readable storage device of claim 16, wherein the controller is part of a media communication system selected from a group consisting of an internet protocol television communication system, a cable television communication system, a satellite television communication system, a public switched television network, a voice over internet protocol communication system and an internet protocol multimedia subsystem combining the public switched television network and voice over internet protocol communication systems.

* * * * *